US007789422B2

(12) United States Patent
Webber (10) Patent No.: US 7,789,422 B2
(45) Date of Patent: Sep. 7, 2010

(54) INFLATABLE CUSHION AND METHOD FOR ATTACHMENT

(75) Inventor: James L. Webber, Shelby Township, MI (US)

(73) Assignee: Autoliv Development AB, Troy, MI (US)

( * ) Notice: Subject to any disclaimer, the term of this patent is extended or adjusted under 35 U.S.C. 154(b) by 383 days.

(21) Appl. No.: 11/553,801

(22) Filed: Oct. 27, 2006

(65) Prior Publication Data

US 2008/0100049 A1    May 1, 2008

(51) Int. Cl.
 *B60R 21/20* (2006.01)
(52) U.S. Cl. .................................... 280/743.2
(58) Field of Classification Search .............. 280/743.2, 280/732, 4, 743.1
 See application file for complete search history.

(56) References Cited

U.S. PATENT DOCUMENTS

| 6,648,371 | B2 * | 11/2003 | Vendely et al. ............. 280/739 |
| 7,377,546 | B2 * | 5/2008 | Fischer et al. ............. 280/739 |
| 2005/0146122 | A1 * | 7/2005 | Gould et al. ............... 280/739 |
| 2006/0170202 | A1 * | 8/2006 | Block et al. ............... 280/743.2 |
| 2006/0290117 | A1 * | 12/2006 | Fischer et al. ............. 280/739 |
| 2007/0052218 | A1 * | 3/2007 | Miyata ..................... 280/730.1 |
| 2007/0170709 | A1 * | 7/2007 | Braun et al. ................ 280/739 |
| 2008/0036188 | A1 * | 2/2008 | Gould et al. ............... 280/739 |
| 2008/0100049 | A1 * | 5/2008 | Webber .................... 280/743.2 |
| 2008/0238062 | A1 * | 10/2008 | Parks et al. ............... 280/743.2 |
| 2009/0121460 | A1 * | 5/2009 | Abe et al. ................ 280/728.3 |

* cited by examiner

*Primary Examiner*—Paul N Dickson
*Assistant Examiner*—Karen Jane J Amores
(74) *Attorney, Agent, or Firm*—Harness, Dickey & Pierce, P.L.C.

(57) ABSTRACT

An inflatable cushion for an air bag module, the inflatable cushion comprising: an inflation opening for providing fluid communication to an interior of the inflatable cushion; a first tether having a cushion securement end and a mounting end, the cushion securement end being fixedly secured to the inflatable cushion and the mounting end having a mounting member, the mounting member being capable of pivotal movement with respect to the mounting end, wherein the mounting member is an integral portion of the first tether folded and secured upon itself to define the mounting member; and wherein the mounting member is capable of being positioned between a first position and a second position, the first position being orthogonal to a portion of the first tether and the second position being parallel to a portion of the first tether.

21 Claims, 4 Drawing Sheets

INSERTED
FIG. 5

END TURNED
FIG. 6

LOADED CONDITION
FIG. 7

CONSTRUCTION DETAILS
FIG. 8

INFLATABLE CUSHION AND METHOD FOR ATTACHMENT

BACKGROUND

This present invention relates generally to airbags or inflatable cushions for vehicles. More specifically, the present invention relates to inflatable cushions and methods for securing the inflatable cushion to an airbag module.

Airbag modules have become common in modern automobiles. An airbag module typically comprises an inflatable cushion and an inflator for inflating the inflatable cushion. Accordingly, the inflatable cushion needs to be in fluid communication with the inflator so that the inflation force can be supplied to the inflatable cushion. In some airbag modules the inflatable cushion and the inflator or portions thereof are secured to a housing and the airbag module is secured to the vehicle via the housing. The airbag module is installed in a desired position within the vehicle, such as the steering wheel, the dashboard, the seat, vehicle doors, the A-pillar, and other locations. The inflatable cushion is stored in a folded position within the housing in fluid communication with the inflator. In response to an activation event or occurrence, a sensor provides a signal for activating the inflator. The inflator provides a supply of inflating gas to the cushion to inflate the cushion, deploying it from the housing into the vehicle.

During assembly or manufacture of the airbag module the inflatable cushion is fixedly secured about the inflation openings of the inflator. Various methods have been employed to secure the inflatable cushion to the housing and/or inflator in order to provide a robust and effective seal between the inflatable cushion opening and the inflator.

One contemplated method is to insert a metal retainer ring within the inflatable cushion wherein the ring defines a peripheral opening with a plurality of studs that pass through a peripheral edge of the inflation opening of the inflatable cushion. Thereafter, the retainer ring and the inflatable cushion are secured about the inflation opening of the inflator by passing the studs through complementary openings in the housing and/or a portion of the inflator. However, this method requires the insertion of a ring within the cushion and securing the same about the inflator. In addition, and in passenger side airbag modules the inflation opening of the inflatable cushion has been traditionally secured about the periphery of the housing of the passenger side airbag module, which in some designs defines an elongated rectangular opening. Accordingly, the retainer ring for such a module is typically larger and as such increases the manufacturing costs and assembly time of the airbag module. If the retaining ring and inflation opening of the inflatable cushion is reduced and/or the location of securement of the inflatable cushion to the housing is moved to a lower or bottom portion of the housing it may be desirable to provide lateral support to the inflatable cushion, which may have been provided by a larger retainer ring.

Accordingly, it is desirable to provide an inflatable cushion with a means for securing the same about the inflation opening of the inflator as well as to the housing of the airbag module.

SUMMARY

Disclosed herein is an inflatable cushion for an air bag module, the inflatable cushion comprising: an inflation opening for providing fluid communication to an interior of the inflatable cushion; a first tether having a cushion securement end and a mounting end, the cushion securement end being fixedly secured to the inflatable cushion and the mounting end comprises a mounting member, the mounting member being capable of pivotal movement with respect to the mounting end, wherein the mounting member is an integral portion of the first tether folded and secured upon itself to define the mounting member; and wherein the mounting member is capable of being positioned between a first position and a second position, the first position being orthogonal to a portion of the first tether and the second position being parallel to a portion of the first tether.

In another exemplary embodiment, a method for securing an inflatable cushion to a housing of an airbag module is provided, the method comprising: securing a cushion securement end of a first tether to a portion of the inflatable cushion; inserting a mounting end of the first tether through a mounting opening in the housing, wherein the mounting end of the first tether having a mounting member that is capable of being positioned between a first position and a second position, the first position being orthogonal to the mounting end of the first tether and the second position being substantially parallel to the mounting end of the first tether, wherein the mounting member of the first tether cannot pass through the mounting opening when the mounting member is in the first position.

In yet another exemplary embodiment, an air bag module is provided, the air bag module comprising: a housing; an inflatable cushion being stored in an un-deployed position in the housing, the inflatable cushion being configured to be deployed out of the housing; an inflator for inflating the inflatable cushion, the inflator being in fluid communication with an opening in the inflatable cushion; a first tether having a cushion securement end and a mounting end, the cushion securement end being fixedly secured to the inflatable cushion and the mounting end having a mounting member, the mounting member being capable of pivotal movement with respect to the mounting end, wherein the mounting member is an integral portion of the first tether folded and secured upon itself to define the mounting member and wherein the mounting member is capable of being positioned between a first position and a second position, the first position being orthogonal to a portion of the first tether and the second position being parallel to a portion of the first tether; and a first slot disposed in the housing, the first slot being configured to allow the mounting member to pass therethrough when the mounting member is in the second position and wherein the mounting member is prevented from passing through the first slot when the mounting member is in the first position.

The above-described and other features of the present disclosure will be appreciated and understood by those skilled in the art from the following detailed description, drawings, and appended claims.

DESCRIPTION OF EXEMPLARY EMBODIMENTS

Disclosed herein is a method and apparatus for securing an inflatable cushion to a housing of an airbag module.

Figure 1:
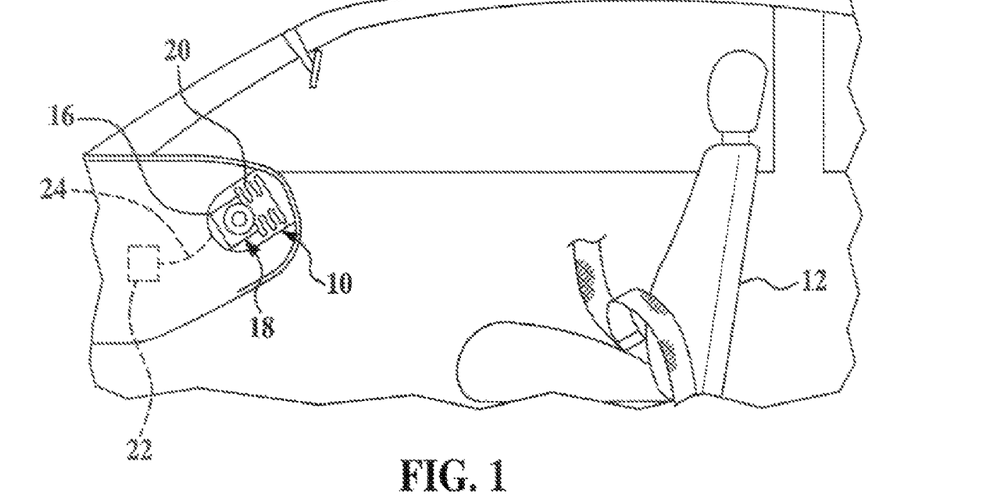
FIG. 1 is a partial view of a vehicle interior having an airbag module in accordance with an exemplary embodiment of the present invention.
Figure 2:
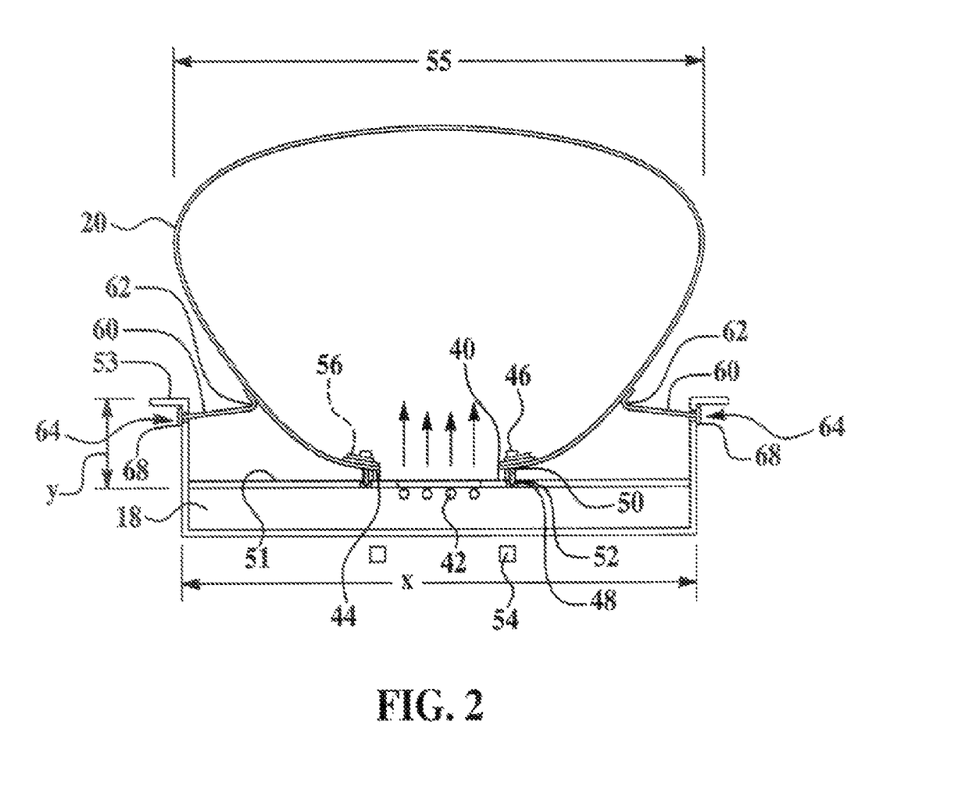
FIGS. 2 and 2A are cross sectional views of an airbag module constructed in accordance with exemplary embodiments of the present invention.

Referring to the drawings and in particular FIGS. 1 and 2, one exemplary embodiment of an air bag module 10 constructed in accordance with an exemplary embodiment of the present invention is illustrated. Here a portion of an interior of a vehicle is illustrated. Included in the interior compartment of the vehicle is a seating structure 12 and air bag module 10. Airbag module 10 is disposed in a selected spatial relationship with respect to seating structure 12. The air bag module 10 comprises a housing 16, an inflator 18, and an inflatable air bag or cushion 20. The inflatable cushion is made of a fabric material such as nylon or polyester as is known in the related arts. In accordance with an exemplary embodiment, the module 10 is positioned in the vehicle for deployment of the cushion 20 towards the seating structure 12.

A sensor or sensing-and-diagnostic module 22 is adapted to detect an activation event wherein the occurrence of a threshold event will cause an activation signal 24 to be generated and received by the inflator 18, thereby causing the inflator to inflate the inflatable cushion by providing an inflation output. The detection of the threshold event is determined by one or more sensors that are disposed about the vehicle in accordance with known technologies. Thus, the activation signal 24 controls the activation of the airbag module 10.

The inflatable cushion is stored in a folded or undeployed position in housing 16. The cushion is positioned to be in fluid communication with the inflator 18 wherein generation of the inflation output or inflating gas will cause the cushion to inflate. Upon detection of an activation event by the sensing-and-diagnostic module 22, the inflator 18 is activated via signal 24 to generate the inflation gas. The inflation gas causes the cushion 20 to inflate and expand from housing 16 into the interior of the vehicle. It should be recognized that module 10 is illustrated by way of example only as being included in the dashboard of the vehicle. Of course, it is contemplated that module 10 can be installed for deployment in other regions of the vehicle, such as, but not limited to the steering wheel, the seat, the A-pillar, the roof, and other locations as well as other angular or positional relationships illustrated in FIG. 1. Moreover, the specific configurations of the vehicle interior, instrument panel, airbag module and relationship with regard to the same are provided as an example and it is, of course, understood that these configurations may vary from the specific configurations illustrated in FIG. 1.

Additionally, the present disclosure is also contemplated for use with various types of inflatable cushions and inflators. For example, cushions which are folded in a particular manner to achieve various deployment configurations and various types of inflators (e.g., dual stage inflators).

In addition, and in accordance with the present disclosure, the sensing-and-diagnostic module can also be adapted to detect one or more conditions of the seating structure. For example, sensing-and-diagnostic module 22 can be adapted to detect one or more of the following: a load or amount of load (e.g., occupant weight) on the seating structure 12, a position of the seating structure, an angle of a portion of the seating structure with respect to another portion, the distance the seating structure is from the air bag module 10, and other data that is relevant to the deployment of the airbag by receiving input from a plurality of sensors disposed about the vehicle.

In accordance with an exemplary embodiment of the present invention and referring now to FIG. 2, inflation energy or gas input to the inflatable cushion is facilitated through an inflation opening 40 of the inflatable cushion disposed about inflation openings 42 of the inflator. In one exemplary embodiment a peripheral portion 44 of the inflation opening is secured to the housing via a retainer or retaining ring 46. Retainer 46 is configured to be placed within an inflation opening of the inflatable cushion and comprises a plurality of studs or mounting means 48 which pass through openings in the inflatable cushion and secure the same to the housing by passing through openings in the housing.

In accordance with one exemplary embodiment, retaining ring 46 comprises a plurality of threaded studs 48 that pass through complimentary openings 50 in the peripheral portion and openings 52 in the housing. In one non-limiting exemplary embodiment, the retainer ring and the inflatable cushion is secured to the housing by a plurality of nuts 54 or other equivalent members that engage the threaded studs of the retaining ring.

As illustrated, the retainer ring and the inflation opening are configured to surround the inflation openings of the inflator, which typically do not traverse the entire length of the inflator housing. However, and as illustrated in FIG. 2, the airbag module housing has a length in the "x" direction, which is longer than the width of the inflation opening of the inflatable cushion and a dimension of the retainer ring.

Moreover, and as illustrated in FIG. 2 and by mounting the cushion opening about the inflator at a bottom 51 of the housing as opposed to a peripheral edge 53 of the housing the mounting location of the cushion is lower in the housing by a distance "Y". Thus, the inflatable cushion may require lateral support to counteract the forces in the direction of arrows 55. Although, the inflator is shown mounted below the housing it is, of course, understood that the housing and inflator configuration may vary from those illustrated in the drawings and the same are provided as non-limiting examples.

Accordingly and by providing a lower and smaller mounting area about the cushion opening, it is desirable to provide additional support or lateral support to the inflatable cushion. In accordance with an exemplary embodiment, this additional support and stability is provided by attachment tethers that are quickly secured to the housing without the need of any attachment components or tools. Accordingly, a fastenerless airbag cushion attachment device is provided.

In other words and in accordance with an exemplary embodiment of the present invention, a mounting of the inflatable cushion proximate to the inflator openings is provided and/or supplemented by attachment tethers wherein additional stability is also provided.

In another alternative exemplary embodiment, the periphery of the inflation opening comprises a plurality of rings or rectangular shaped layers 56 sewn together to provide reinforcement about the periphery of the inflation opening and the studs of the retainer ring pass through openings in each of the layers.

In yet another alternative exemplary embodiment, the periphery of the inflation opening comprises a plurality of rings or rectangular shaped layers 56 sewn together to provide reinforcement about the periphery of the inflation opening and the opening is secured to the housing without a retainer ring as a plurality of hooks of the housing pass through the openings in the inflatable cushion or in yet another alternative a plurality of mounting studs or bolts are used to secure the inflatable cushion to the housing.

Figure 2A:
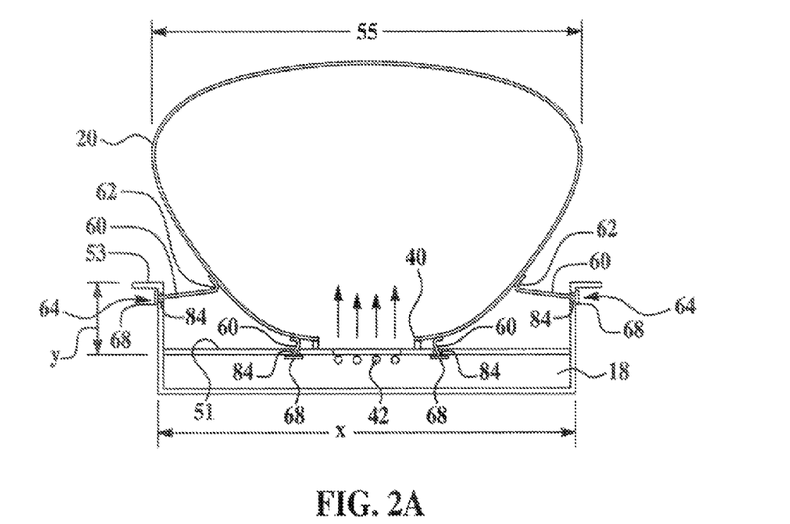

In accordance with an exemplary embodiment and referring to FIG. 2A, the inflatable cushion is only secured to the housing by a plurality of attachment tethers wherein shorter tethers are provided proximate to the inflation opening of the inflatable cushion and longer tethers are secured further away from the inflation opening in order to provide stability to the inflatable cushion. In this embodiment, the inflation opening attachment tethers are disposed about the periphery of the inflation opening. In accordance with this embodiment, the attachment tethers are quickly secured to the housing without the need of any attachment components or tools. Accordingly, a fastenerless airbag cushion attachment device is provided as the mounting ends of the attachment tethers are simply slid through openings in the housing. Of course, the lengths of the tethers may vary as the shorter tethers may be mounted to the bottom of the housing and the longer tethers are mounted to the sidewalls of the housing. In yet another alternative, only the tethers proximate to the inflation opening of the inflatable cushion secure the inflatable cushion to the housing wherein the tether lengths are substantially the same or vary as may be required to only mount the inflatable cushion to the housing proximate to the inflation opening.

In accordance with an exemplary embodiment and referring now to FIGS. 2-8, the inflatable cushion is provided with at least one or preferably a plurality of mounting tethers 60 each of which has a cushion securement end 62, and a mounting end 64. Although FIGS. 3-8 illustrate a single tether it is understood that in accordance with an exemplary embodiment the inflatable cushion will have a plurality of tethers or alternatively, the inflatable cushion may have a single attachment tether and the securement of the cushion is supplemented by other conventional attachment means (e.g., retainers, retainer rings, bolts, hooks etc.). Cushion securement end 62 is attached to the inflatable cushion proximate to the inflation opening by any suitable method. One non-limiting example is a plurality of stitches. In one exemplary embodiment the cushion securement end is attached to an exterior surface of the cushion. Mounting end 64 further comprises a mounting member 68, which is configured to secure tether 60 to the housing. FIGS. 3-8 illustrate a portion of the inflator housing having opening 84 therein. It is, of course, understood that in accordance with an exemplary embodiment of the present invention the housing will have multiple openings for use with multiple tethers disposed about the opening of the inflatable cushion as FIGS. 3-8 show only a single tether and a portion of the inflatable cushion and a portion of the housing.

In accordance with an exemplary embodiment, the mounting member is defined by folding an end of the tether about itself several times until a sufficient thickness is provided. One non-limiting example of a sufficient thickness is a thickness of at least three times that of the thickness of the tether. These thicknesses are illustrated schematically as 70 and 72 in FIGS. 3 and 4. Of course, thicknesses greater or less than the aforementioned values are contemplated to be within the scope of exemplary embodiments of the present invention. Non-limiting examples include two times or four times the thickness of the tether and complimentary sized openings in the housing. Of course, thicknesses greater or less than the aforementioned values and corresponding sized openings in the housing are contemplated to be within the scope of exemplary embodiments of the present invention.

In one exemplary embodiment, the tether is formed from the same material as the inflatable cushion. In an alternative embodiment, the tether is formed from other materials having a greater tensile strength than the material of the inflatable cushion.

Figure 3:
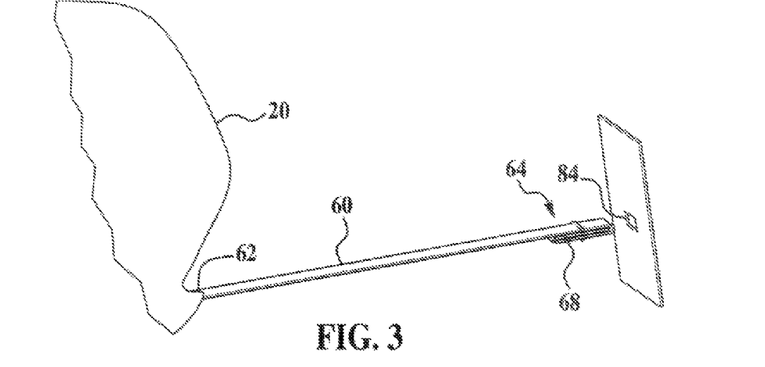
FIGS. 3-8 are partial views of exemplary embodiments of the present invention.
Figure 4:
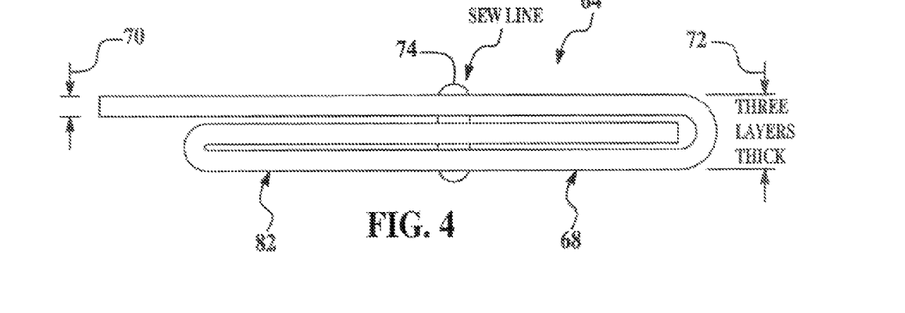

In accordance with an exemplary embodiment, the mounting member is formed by folding an end of the tether about itself at least three times and thereafter the end is sewn together by a plurality of stitches 74. Of course, the stitches may be applied during any part of the folding process. Thereafter, a mounting member 68 is provided.

In accordance with an exemplary embodiment, and as illustrated the mounting member is stitched together in a middle portion so that the mounting member is capable of pivotal movement with respect to the mounting end 64, wherein the mounting member comprises an integral portion of the tether folded and secured upon itself to define the mounting member. In accordance with an exemplary embodiment the mounting member is capable of being positioned between a first position 80 and a second position 82, the first position being orthogonal to a portion of the first tether and the second position being substantially parallel to a portion of the first tether.

Figure 5:
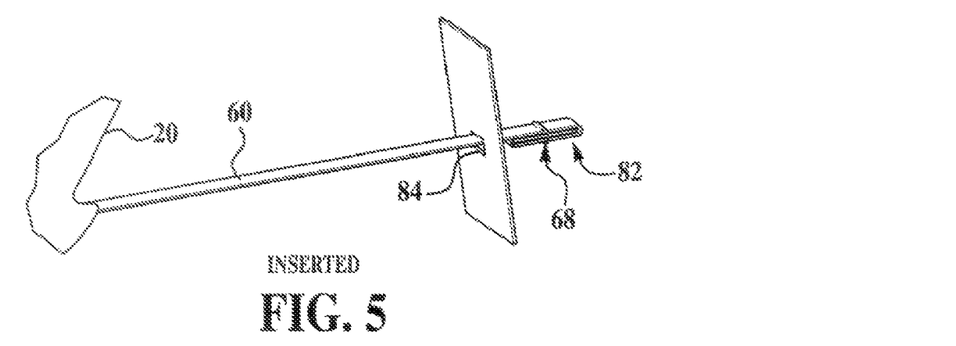
Figure 6:
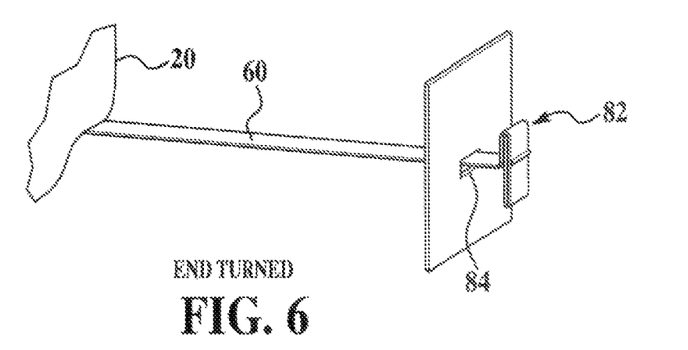

As illustrated, the mounting member is manipulated into the second position and then slid through an opening 84 in the housing of the airbag module. In accordance with an exemplary embodiment, opening 84 is configured to allow thickness 72 and a transverse width of the tether to pass through (second position) while opening 84 is configured to prevent the mounting member from passing therethrough when the mounting member is in the first position. In accordance with an exemplary embodiment and in order to do this, a dimension 88 of the opening is less than five times the thickness 70 of the tether. In another exemplary embodiment, the dimension is slightly larger than three times the thickness of the tether (e.g., just large enough to pass the mounting member therethough when it is in the second position). Of course, thicknesses greater or less than the aforementioned valves are contemplated to be within the scope of exemplary embodiments of the present invention as along as the desired effect is achieved namely, allowing the mounting member to pass therethrough when in the second position and preventing the passing of the mounting member through the opening when the same is in the first position.

In addition, and as the inflatable cushion deploys a tension or load is applied in the direction of arrow 90 (FIG. 7) and when the mounting member is in the first position the same is prevented from passing through the slot in the housing.

Figure 7:
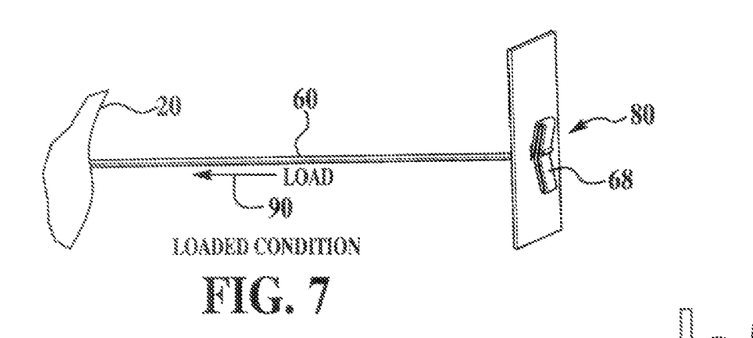

In accordance with an exemplary embodiment of the present invention the length of the tether from a cushion securement point 92 and the corresponding opening in the housing is configured to allow the mounting member to be inserted in the mounting opening (e.g., mounting member in the second position) and then as the cushion is mounted about the inflator a slight tension or load in the direction of arrow 90 is applied thus maintaining the mounting member in the first position.

In another alternative exemplary embodiment, the tether comprises an elastic material, which when a tension or load is applied in the direction of arrow 90 will expand and thus provide a corresponding tension in a direction opposite to arrow 90 thus maintaining the mounting member in the first position.

In accordance with an alternative exemplary embodiment, the material contemplated for tether 60 has a shape maintaining or memory characteristic such that once manipulated into the first position the mounting member is biased back towards that position thus preventing inadvertent removal of the mounting member from the slots of the housing. This may be employed in lieu of the tether lengths described above or in addition to the tether lengths described above.

Figure 8:
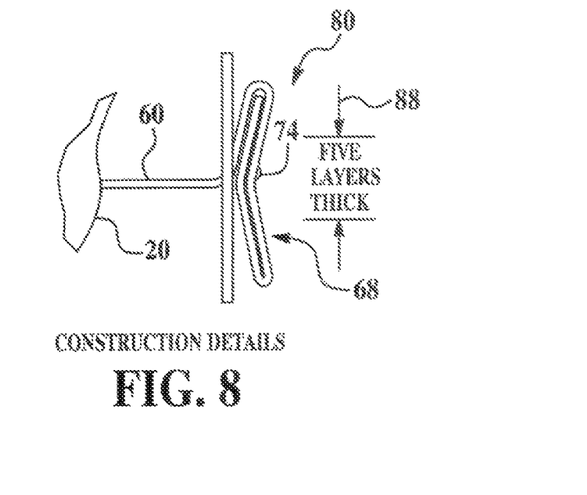

In accordance with another alternative exemplary embodiment of the present invention the location of stitches 74 enhance the memory characteristic of the mounting member such that once the mounting member is manipulated into the first position the mounting member is biased back towards that position thus preventing inadvertent removal of the mounting member from the slots of the housing.

Figure 9:
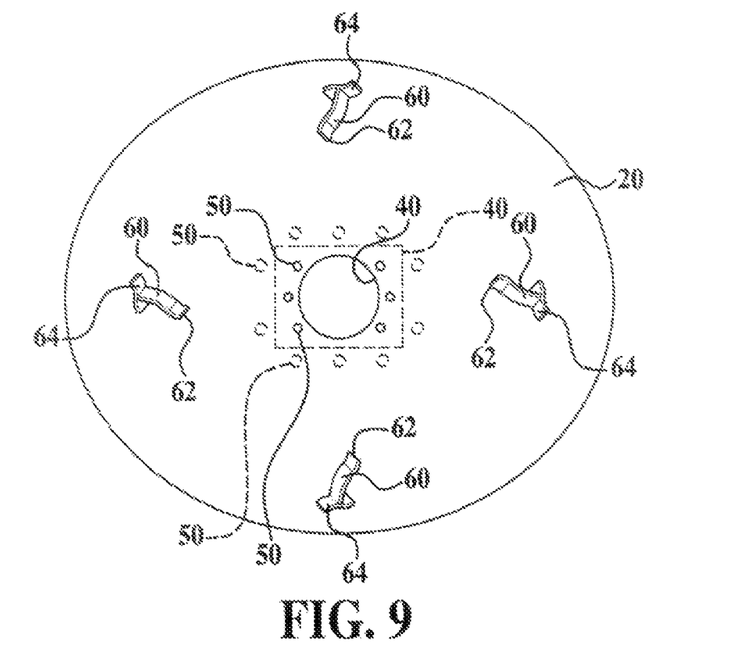
FIGS. 9 and 10 are views of an inflatable cushion constructed in accordance with exemplary embodiments of the present invention.

Referring now to FIG. 9, an inflatable cushion 20 constructed in accordance with an exemplary embodiment of the present invention is illustrated. Here cushion 20 is provided with a plurality of attachment tethers 60, each having a cushion securement end 62 and a mounting end 64. In accordance with an exemplary embodiment, mounting end 64 has a mounting member 68 as discussed above. As illustrated, the inflatable cushion has an inflation opening 40, which can be circular, rectangular (dashed lines) or any other suitable configuration. In this embodiment, the inflatable cushion has a plurality of mounting openings 50, which are configured to pass a mounting member (e.g., bolt, stud, etc.) of a retainer therethrough. Alternatively, the individual bolts or studs are passed therethrough or bolts or hooks of the housing are passed therethrough for mounting of the peripheral portion of the inflatable cushion about the inflator openings.

Figure 10:
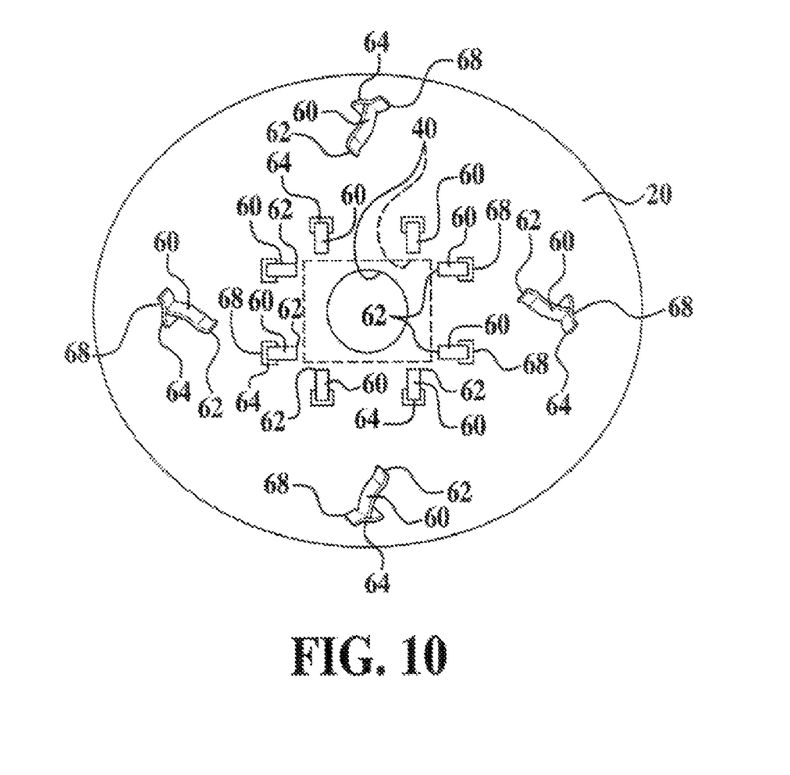

In yet another exemplary embodiment and referring now to FIG. 10 only the attachment tethers are used for securing the inflatable cushion to the housing. Here a first set of tethers are mounted proximate to the inflation opening and a second set of tethers are mounted further away from the inflation opening. In accordance with an exemplary embodiment, the first set of tethers secure the inflation opening about the inflation openings of the inflator while the second set of tethers provide lateral or other stability to the cushion. As illustrated, the length of the first set of tethers is shorter than the length of the second set of tethers. Of course, the length of the attachment tethers may vary as the attachment points to the cushion varies as well as the size of the housing and the location of the mounting openings in the housing varies. It is, of course, understood that the location number and length of the attachment tethers may vary from those illustrated in the Figures as the same are merely provided as non-limiting examples. For example, only one set of tethers may be employed, which may be proximate to the inflation opening or further away.

In addition, and as illustrated in FIGS. 9 and 10, the attachment tethers are mounted about the periphery of the inflatable cushion to provide a means for mounting as well as stability around the entire cushion. Alternatively, the attachment tethers may be localized in discrete areas in order to provide the desired performance. In one embodiment, the attachment tethers may be positioned to correspond to the configuration of the housing.

In accordance with exemplary embodiments of the present invention, the attachment tether or tethers provide(s) a means for quick hand attachment of cushion to the airbag module housing in order to provide cushion stability and/or attachment. This is in contrast to hard fasteners such as bolts, rivets etc, which would be secured to the attachment end of the tether or a larger retainer ring that covers the periphery of the housing, which is typically larger than the area of the inflator comprising the inflator openings. Accordingly, cushion attachment can be achieved without plastic or metal rings/fasteners thereby reducing associated cost and providing an improvement in the manufacturing process.

Although a passenger side airbag module is illustrated in FIGS. 1 and 2 it is understood that exemplary embodiments of the present invention are contemplated for use with driver side airbag modules, side airbag modules as well as any other type of airbag module.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An inflatable cushion for an air bag module, the inflatable cushion comprising:
    an inflation opening for providing fluid communication to an interior of the inflatable cushion;
    a first tether having a cushion securement end and a mounting end, the cushion securement end being fixedly secured to an exterior surface of the inflatable cushion and the mounting end having a mounting member that is configured to provide a fastenerless attachment device for securement of the mounting end of the first tether to a housing, the mounting member being capable of pivotal movement with respect to the mounting end, wherein the mounting member is an integral portion of the first tether folded and secured upon itself to define the mounting member, and wherein the mounting member is capable of being positioned between a first position and a second position, the first position being orthogonal to a portion of the first tether and the second position being parallel to a portion of the first tether,
    a plurality of tethers each having a cushion securement end and a mounting end, the cushion securement ends of the plurality of tethers being fixedly secured to the inflatable cushion and the mounting ends of the plurality of tethers each comprise a mounting member being capable of pivotal movement with respect to the mounting end of the plurality of tethers, wherein each mounting member is an integral portion of a respective one of the plurality of tethers folded and secured upon itself to define,
    wherein each of the mounting members is capable of being positioned between a first position and a second position, the first position being orthogonal to a respective one of the plurality of tethers and the second position being parallel to a respective one of the plurality of tethers,
    wherein the plurality of tethers further comprises a first set of tethers and a second set of tethers, the cushion securement end of each of the first set of tethers being mounted proximate to the inflation opening and the cushion securement end of each of the second set of tethers being mounted further away from the inflation opening than the cushion securement end of the first set of tethers, wherein the first set of tethers are shorter than the second set of tethers and the first tether is one of the second set of tethers and each of the cushion securement ends of the first and second set of tethers is secured to an exterior surface of the inflatable cushion.

2. The inflatable cushion as in claim 1, further comprising:
    a second tether having a cushion securement end and a mounting end, the cushion securement end being fixedly secured to the inflatable cushion and the mounting end having a mounting member, the mounting member being capable of pivotal movement with respect to the mounting end, wherein the mounting member is an integral portion of the second tether folded and secured upon itself to define the mounting member; and wherein the mounting member is capable of being positioned between a first position and a second position, the first position being orthogonal to a portion of the second tether and the second position being parallel to a portion of the second tether.

3. The inflatable cushion as in claim 2, wherein the cushion securement ends of the first tether and the second tether are proximate to the inflation opening.

4. The inflatable cushion as in claim 2, wherein the mounting member of the first tether and the second tether have a thickness of at least three times that of the first tether and the second tether.

5. The inflatable cushion as in claim 4, wherein the cushion securement end of the first tether and the second tether are sewn to the inflatable cushion.

6. The inflatable cushion as in claim 1, wherein the plurality of tethers are disposed about the periphery of the inflatable cushion.

7. An air bag module, comprising:
a housing;
an inflatable cushion being stored in an un-deployed position in the housing, the inflatable cushion being configured to be deployed out of the housing;
an inflator for inflating the inflatable cushion, the inflator being in fluid communication with an opening in the inflatable cushion;
a first tether having a cushion securement end and a mounting end, the cushion securement end being fixedly secured to an exterior surface of the inflatable cushion and the mounting end having a mounting member, the mounting member being capable of pivotal movement with respect to the mounting end, wherein the mounting member is an integral portion of the first tether folded and secured upon itself to define the mounting member and wherein the mounting member is capable of being positioned between a first position and a second position, the first position being orthogonal to a portion of the first tether and the second position being parallel to a portion of the first tether;
a first slot disposed in the housing, the first slot being configured to allow the mounting member to pass therethrough when the mounting member is in the second position and wherein the mounting member is prevented from passing through the first slot when the mounting member is in the first position and the mounting member is the only means for securing the first tether to the housing providing a fastenerless securement of the first tether to the housing;
a plurality of tethers each having a cushion securement end and a mounting end, the cushion securement ends of the plurality of tethers being fixedly secured to the inflatable cushion and the mounting ends of the plurality of tethers each comprise a mounting member being capable of pivotal movement with respect to the mounting end of the plurality of tethers, wherein each mounting member is an integral portion of a respective one of the plurality of tethers folded and secured upon itself to define, and wherein each of the mounting members is capable of being positioned between a first position and a second position, the first position being orthogonal to a respective one of the plurality of tethers and the second position being parallel to a respective one of the plurality of tethers; and a plurality of slots disposed in the housing, the plurality of slots being configured to allow a respective one of the mounting members of the plurality of tethers to pass therethrough when the mounting member is in the second position and wherein the mounting member is prevented from passing through the slot when the mounting member is in the first position, wherein the plurality of tethers further comprises a first set of tethers and a second set of tethers, the cushion securement end of each of the first set of tethers being mounted proximate to the inflation opening and the cushion securement end of each of the second set of tethers being mounted further away from the inflation opening than the cushion securement end of the first set of tethers, wherein the first set of tethers are shorter than the second set of tethers and the first tether is one of the second set of tethers and each of the cushion securement ends of the first and second set of tethers is secured to an exterior surface of the inflatable cushion.

8. The airbag module as in claim 7, wherein the housing has a bottom portion and a plurality of side walls terminating at a peripheral edge defining an opening into the housing, wherein the first slot is positioned in the side wall and the opening of the inflatable cushion being secured to the bottom of the housing, the bottom of the housing being positioned below the peripheral edge of the housing.

9. The airbag module as in claim 7, further comprising:
a second tether having a cushion securement end and a mounting end, the cushion securement end being fixedly secured to the inflatable cushion and the mounting end having a mounting member, the mounting member being capable of pivotal movement with respect to the mounting end, wherein the mounting member is an integral portion of the second tether folded and secured upon itself to define the mounting member, and wherein the mounting member is capable of being positioned between a first position and a second position, the first position being orthogonal to a portion of the second tether and the second position being parallel to a portion of the second tether; and
a second slot disposed in the housing, the second slot being configured to allow the mounting member of the second tether to pass therethrough when the mounting member is in the second position and wherein the mounting member is prevented from passing through the second slot when the mounting member is in the first position.

10. The airbag module as in claim 9, wherein the cushion securement ends of the first tether and the second tether are proximate to the inflation opening.

11. The airbag module as in claim 9, wherein the mounting member of the first tether and the second tether have a thickness of at least three times that of the first tether and the second tether and the first slot and the second slot have a corresponding dimension greater than the thickens of the mounting members, wherein the corresponding dimension is less than another dimension of the mounting member.

12. The airbag module as in claim 11, wherein the cushion securement end of the first tether and the second tether are sewn to the inflatable cushion and the securement end of the first tether and the second tether is formed from a material having a shape maintaining characteristic such that the mounting member is biased back towards the first position preventing inadvertent removal of the mounting member from the first slot and second slot of the housing.

13. The inflatable cushion as in claim 7, wherein the plurality of tethers are disposed about the periphery of the inflatable cushion and the inflatable cushion is only mounted to the housing by the plurality of tethers.

14. The inflatable cushion as in claim 7, wherein the plurality of tethers are disposed about the periphery of the inflatable cushion.

15. The airbag module as in claim 7, wherein the airbag module is either a driver side or passenger side airbag module.

16. The airbag module as in claim 7, wherein the inflator is cylindrically shaped and the plurality of inflation openings are disposed about a periphery of the inflator.

17. A method for securing an inflatable cushion to a housing of an airbag module, the method comprising:
   securing a cushion securement end of a first tether to an exterior portion of the inflatable cushion; and
   inserting a mounting end of the first tether through a mounting opening in the housing, wherein the mounting end of the first tether having a mounting member that is capable of being positioned between a first position and a second position, the first position being orthogonal to the mounting end of the first tether and the second position being substantially parallel to the mounting end of the first tether, wherein the mounting member of the first tether cannot pass through the mounting opening when the mounting member is in the first position, the mounting member providing a fastenerless securement of the first tether to the housing,
   wherein the inflatable cushion further comprises: a plurality of tethers each having a cushion securement end and a mounting end, the cushion securement ends of the plurality of tethers being fixedly secured to the inflatable cushion and the mounting ends of the plurality of tethers each have a mounting member being capable of movement between a first position and a second position, the first position being orthogonal to the mounting end of the second tether and the second position being substantially parallel to the mounting end of the second tether, wherein the mounting member of the plurality of tethers cannot pass through a mounting opening in the housing when the mounting members are in the first position, wherein each mounting member is an integral portion of a respective one of the plurality of tethers folded and secured upon itself; and wherein the inserting step includes inserting the mounting end of each of the plurality of tethers through one of a plurality of mounting openings in the housing and wherein the cushion securement ends of the plurality of tethers is secured to an exterior surface of the inflatable cushion, wherein the plurality of tethers further comprises a first set of tethers and a second set of tethers, the cushion securement end of each of the first set of tethers being mounted proximate to an inflation opening of the inflatable cushion and the cushion securement end of each of the second set of tethers being mounted further away from the inflation opening than the cushion securement end of the first set of tethers, wherein the first set of tethers are shorter than the second set of tethers and the first tether is one of the second set of tethers and wherein the plurality of tethers are disposed about a periphery of the inflatable cushion and the inflatable cushion is only mounted to the housing by the plurality of tethers.

18. The method as in claim 17, further comprising:
   securing an inflation opening of the inflatable cushion about an inflator, wherein the one end of first tether is proximate to the inflation opening.

19. The method as in claim 17, further comprising:
   securing a securement end of a second tether to a portion of the inflatable cushion;
   inserting a mounting end of the second tether through another mounting opening in the housing, wherein the mounting end of the second tether having a mounting member that is capable of being positioned between a first position and a second position, the first position being orthogonal to the mounting end of the second tether and the second position being substantially parallel to the mounting end of the second tether, wherein the mounting member of the second tether cannot pass through the another mounting opening when the mounting member is in the first position.

20. The method as in claim 19, further comprising:
   securing an inflation opening of the inflatable cushion about an inflator, wherein the one end of first tether and the one end of the second tether are proximate to the inflation opening, wherein the mounting opening and the another mounting opening are located on opposite sides of the housing.

21. The method as in claim 20, wherein the mounting member of the first tether and the second tether each have a thickness of at least three times that of the first tether and the second tether and wherein the cushion securement end of the first tether and the second tether are sewn to the inflatable cushion and wherein the first tether and the second tether are secured to the housing without any fasteners.

* * * * *